United States Patent [19]

Hapke

[11] 4,073,440
[45] Feb. 14, 1978

[54] COMBINATION PRIMARY AND FAN AIR THRUST REVERSAL CONTROL SYSTEMS FOR LONG DUCT FAN JET ENGINES

[75] Inventor: Donald W. Hapke, Issaquah, Wash.

[73] Assignees: The Boeing Company, Seattle, Wash.; Aeritalia S.p.A., Naples, Italy; part interest to each

[21] Appl. No.: 681,398

[22] Filed: Apr. 29, 1976

[51] Int. Cl.² .............................................. F02K 3/06
[52] U.S. Cl. ............................ 239/265.29; 60/226 A; 239/265.31; 244/110 B
[58] Field of Search .............. 244/110 B, 12 D, 23 D, 244/53 R, 12 S; 60/226 A, 229, 230; 239/265.19, 265.25, 265.27, 265.29, 265.31

[56] References Cited

U.S. PATENT DOCUMENTS

| | | | |
|---|---|---|---|
| 2,798,362 | 7/1957 | Rainbow et al. | 239/265.29 |
| 3,036,431 | 5/1962 | Vdolek | 60/229 |
| 3,068,646 | 12/1962 | Fletcher | 239/265.29 |
| 3,422,624 | 1/1969 | Brooks et al. | 239/265.29 |
| 3,598,318 | 8/1971 | Schiel | 239/265.19 |
| 3,614,037 | 10/1971 | Vdolek | 244/110 B |
| 3,616,648 | 11/1971 | Weise | 60/226 A |
| 3,829,020 | 8/1974 | Stearns | 239/265.29 |
| 3,841,091 | 10/1974 | Sargisson et al. | 60/226 A |

Primary Examiner—Trygve M. Blix
Assistant Examiner—Charles E. Frankfort
Attorney, Agent, or Firm—Christensen, O'Connor, Garrison & Havelka

[57] ABSTRACT

Combination primary and fan air thrust reversal control systems for long duct fan jet engines are disclosed. In one form, the system spoils and expands primary air and, then, allows the spoiled, expanded air to exit from the fan air duct exhaust nozzle while directing fan air in a thrust reversal direction out cascade vanes circumferentially located in the aft portion of the engine nacelle. In other forms, the system directs unequal pressure fan air and primary air through separate thrust reversal ducting and out cascade vanes circumferentially located in the engine nacelle. In equal pressure fan air and primary air systems, the air may be mixed in ducting prior to being emitted from common cascade vanes, or may be maintained separate prior to emission. In still other forms, the primary air is pre-exhausted through separate nozzles located in the primary duct wall, and a portion is then exhausted through the nacelle cascade vanes. In all systems, circumferential cascade vanes are radially located in the rear portion of the engine nacelle and are exposed by rearwardly translating the aft portion of the nacelle, which forms the fan air duct exhaust nozzle. As the fan air duct exhaust nozzle is translated rearwardly, fan air duct blocker doors and, depending on the system, primary air duct blocker doors are positioned to divert the jets for thrust reversing. As an alternative to a primary air duct blocker door, the primary air duct exhaust nozzle is translated rearwardly to contact the exhaust cone or plug and, thereby, valve off the primary air duct. In this case, the fan and primary exhaust nozzles are translated rearwardly as unit.

17 Claims, 11 Drawing Figures

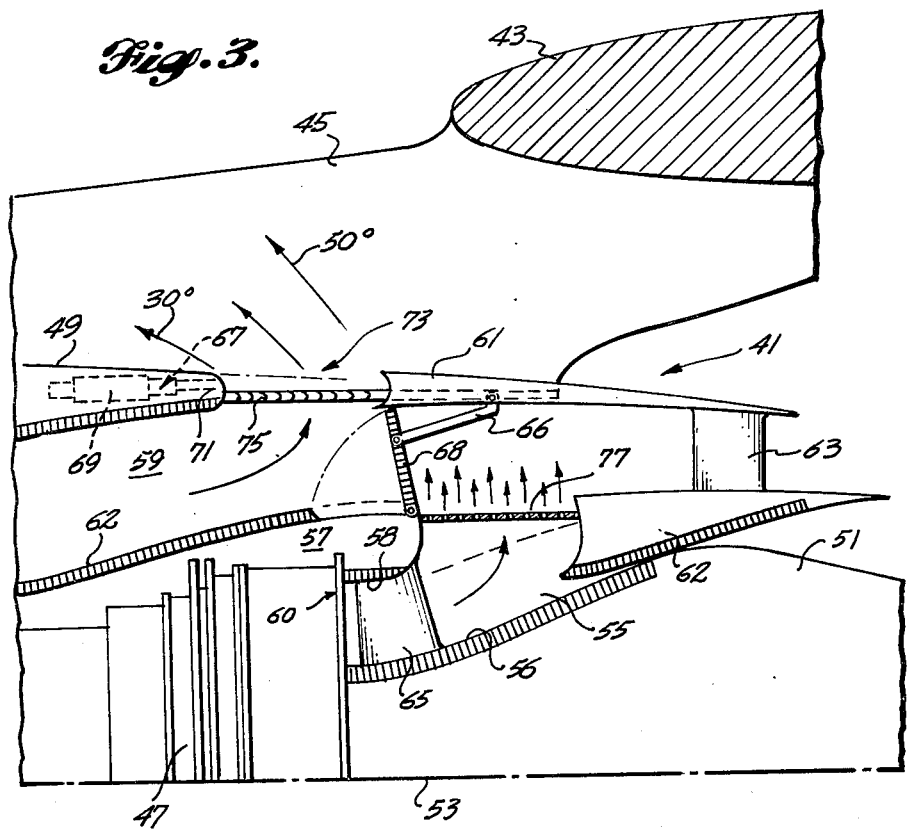
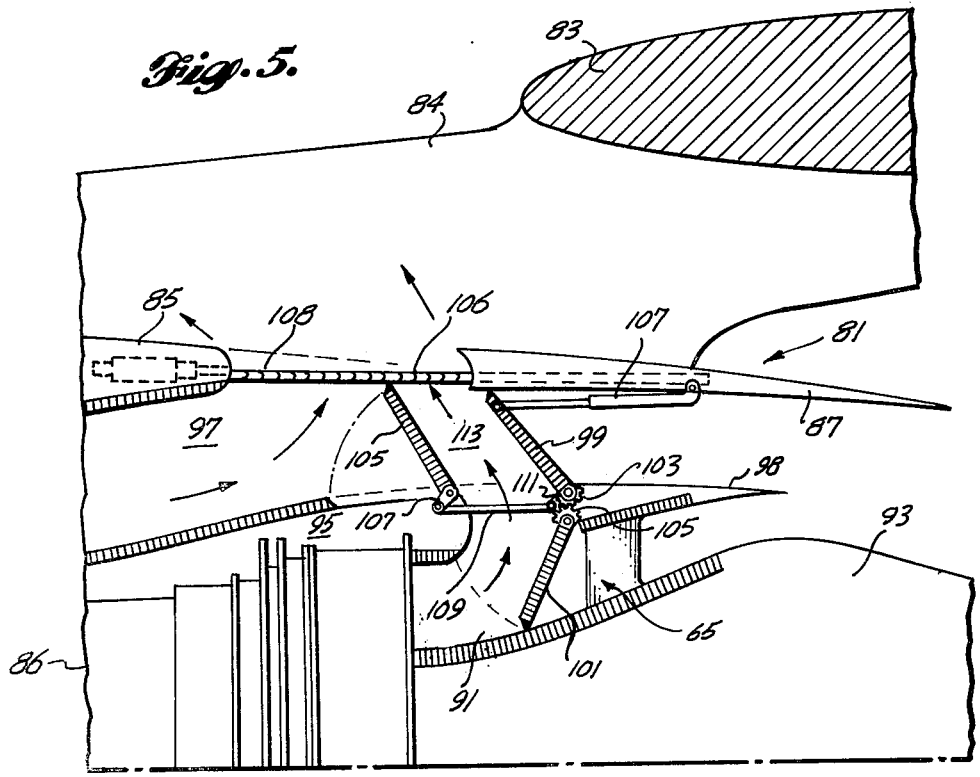

COMBINATION PRIMARY AND FAN AIR THRUST REVERSAL CONTROL SYSTEMS FOR LONG DUCT FAN JET ENGINES

BACKGROUND OF THE INVENTION

This invention is directed to jet engines and, more particularly, to thrust reversal control systems for fan jet engines.

Contemporary commercial and military jet aircraft are designed such that their jet engines are supported in positions ahead of, and below, the wings of the aircraft. Various types of thrust reversal control systems have been proposed for use with such engine/wing configurations. Some such thrust reversal control systems only control fan air during thrust reversal and provide no control over primary air. In such systems, the primary air exhausted under the wing during thrust reversal causes heating and sooting of the under-the-wing area. Heating and sooting, which cause corrosion and increase the rate of material deterioration, require the inclusion of special corrosion resistant and high temperature materials in these areas. In addition, an uncontrolled exhaust plume emitted under the wings during a thrust reversal mode of operation creates ground effect lift by daming the airflow under the wings and increasing pressure under the wing that tends to unload the landing gear and reduce the effect of the aircraft's brakes. Further, damage to the engine may be caused by the ingestion of the exhaust plume, causing engine surge, and ingestion of blown-up ground debris.

In order to alleviate the foregoing problems, the prior art has proposed the inclusion of primary air exhaust spoilers and thrust reverser deflectors. These devices are adapted to spoil and/or direct primary air away from under-the-wing areas. Such devices have met with only limited success in directing hot exhaust gasses away from the aircraft structure and off the runway. While some of these devices have assisted in reducing heat corrosive damage and sooting of the under wing area, adverse ground effect lift and under wing aerodynamic daming problems still exist. In this regard, an engine thrust reverser plume emitted under the wing has the adverse effect of reducing the time period that reversers can be operated during landing roll out. Also, a low profile exhaust plume causes inlet injestion surge, injestion of runway debris and prevents the wing flaps from aerodynamically braking the aircraft.

Therefore, it is an object of this invention to provide a new and improved primary exhaust thrust reversal vectoring control system.

It is a further object of this invention to provide a new and improved primary exhaust control system that substantially reduces heat corrosive damage and sooting of the underwing area of an aircraft during thrust reversal.

It is also an object of this invention to provide a fan and primary exhaust control system that produces zero or very low landing gear unloading thru ground effects caused by under wing exhaust plumes that aerodynamically dam the air under the wing.

Another disadvantage of prior art thrust reversal control systems that control primary air as well as fan air relates to their requirement for individual control mechanisms. More specifically, in the past, particularly prior to the introduction of long duct fan jet engines, one mechanism was used to control fan air and another was used to control primary air. With respect to fan air, usually a ring-shaped portion of the engine nacelle is translated rearwardly to expose cascade vanes. During this rearward movement, fan air duct blocker doors close the fan air duct aft of the cascade vanes to prevent fan air from exhausting rearwardly, whereby the fan air is exhausted in a thrust reversal direction via the cascade vanes. With respect to primary air, usually thrust spoilers or reversers located on the aft end of the engine are moved to primary air control positions. These devices, as noted above spoil and/or deflect primary air. Obviously, two control systems, one for controlling the direction of travel of fan air and another for controlling the direction of travel of primary air during thrust reversal are more complicated and heavier than a single control system. Complexity increases unreliability and weight reduces aircraft payload.

Therefore, it is also an object of this invention to provide combination primary and fan air thrust reversal control mechanisms.

It is another object of this invention to provide combination primary and fan air thrust reversal control mechanisms for long duct fan jet engines.

It is a still further object of this invention to provide thrust reversal control mechanisms for jet engines wherein the direction of flow of fan and primary air during thrust reversal is controlled by a common control mechanism.

It is a still further object of this invention to provide a combination primary and fan air thrust reversal control mechanism that uses primary air as well as fan air for thrust reversal.

SUMMARY OF THE INVENTION

In accordance with principles of this invention, combination primary and fan air thrust reversal control systems for ¾ and longer duct fan jet engines are provided. As will be appreciated by those skilled in the jet engine art, a ¾ duct engine terminates at the primary air turbine flange and longer duct engines extend aft of the turbine flange and may terminate co-planar with the primary air exhaust plane. Such engines may be compared to ¼ and ½ duct fan jet engines wherein the fan air exit plane is proportionally forward of the primary air turbine flange. In one form, the system of the invention spoils primary air and directs it out the fan air duct exhaust nozzle, while at the same time directing fan air in a thrust reversal direction, out cascade vanes peripherally located in the engine nacelle. In other forms, the system directs both fan air and primary air in a thrust reversal direction, out cascade vanes radially located in the engine nacelle. In still other forms, a portion of the primary air is exhausted through an interior exhaust nozzle and directed in a radial direction through the nacelle thrust reverser cascade vanes. If desired, a portion of this primary air may be allowed to exit via the fan air duct exhaust nozzle.

In accordance with further principles of this invention, the thrust reversal cascade vanes are located toward the rear of the engine nacelle and are exposed by axially translating the aft portion of the nacelle (which forms the fan air duct exhaust nozzle) rearwardly. As the fan air duct exhaust nozzle is translated rearwardly, fan air duct and, depending on the mechanization of the invention, primary air duct blocker doors are moved to duct blocking positions.

In accordance with alternative principles of this invention, rather than the inclusion of a primary air duct blocker door, the primary air duct exhaust nozzle, interconnected via struts to the fan air exhaust nozzle, is translated rearwardly to block the primary air duct and redirect primary air.

In accordance with still further principles of this invention, various mechanical mechanisms are provided for coupling the various movable elements of the invention (e.g. the fan air duct exhaust nozzle, the fan air duct blocker door and the primary air duct blocker door, or the primary air duct exhaust nozzle) together. In addition, in embodiments of the invention wherein primary air is directed in a thrust reversal direction along with fan air, mix preventing doors are provided to maintain the fan air separate from the primary air prior to the air exhausting through thrust reversal cascade vanes, if these two types of air are of unequal pressures.

It will be appreciated from the foregoing description that the invention overcomes many of the disadvantages of the prior art noted above. In the primary air spoiler forms of the invention, the spoiling of primary air and directing it into a region where it expands, e.g., the fan air duct exhaust nozzle, decreases the energy in the primary air and, thus, assists in reducing forward thrust in this manner. In addition, even though the primary air is still emitted beneath the wings of the aircraft, because its energy is decreased, the undesirable effects discussed above that occur, when unspoiled and unexpanded air is emitted beneath the wings, are substantially reduced. In the other forms of the invention wherein the primary air is directed forwardly in a thrust reversal direction, these undesirable effects are essentially eliminated. Further, in these forms, the primary air augments the thrust reversal effect of the fan air. Moreover, the utilization of a common mechanism by all forms of the invention results in a substantial weight decrease and improved reliability, based on a reduction in the total number of control system components.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 3 is a cross-sectional view of the embodiment of the invention illustrated in FIG. 2, in its thrust reversal state wherein primary air is spoiled and emitted through the fan air duct and fan air is exhausted through cascade thrust reverser nozzles;

FIG. 5 is a cross-sectional view of an embodiment of the invention wherein primary air and fan air are used for thrust reversal, the primary air and fan air being of unequal pressure are maintained separate prior to exhaustion through cascade vane turning nozzles;

DESCRIPTION OF THE PREFERRED EMBODIMENTS

As will be better understood from the following description of preferred embodiments of the invention, the invention is directed to combination primary and fan air thrust reversal control systems primarily adapted for use with long duct fan jet engines. Fan air is used in all systems for thrust reversal due to its being exhausted through cascade vanes that redirect the air forwardly toward the front of the engine at the same time a fan air duct blocker door is closed. Primary air is either redirected with the fan air through the exposed cascade vanes, or spoiled, expanded into the fan air duct and allowed to exhaust out the fan air duct exhaust nozzle. Regardless of how the primary air is exhausted from the engine, the systems provide for the blocking of the primary air duct.

The combination primary and fan air thrust reversal control systems of the invention include common control mechanisms that simultaneously control the opening of the thrust reversal cascade vanes and the blocking of both the fan air duct and the primary air duct. In addition, mechanisms for maintaining primary and fan air separate, prior to exhaustion in a thrust reversal direction, are included, when the discharge pressures of these two air sources are unequal.

For ease of understanding, as used herein: (1) the fan air duct exhaust nozzle is the rear portion of the fan air duct, generally defined by the portion of the nacelle that is translated rearwardly to expose the cascade vanes; and, (2) the primary air duct exhaust nozzle is the rear portion of the primary air duct, generally defined by the portion of the primary air duct that is translated rearwardly in some embodiments of the invention.

Figure 1:
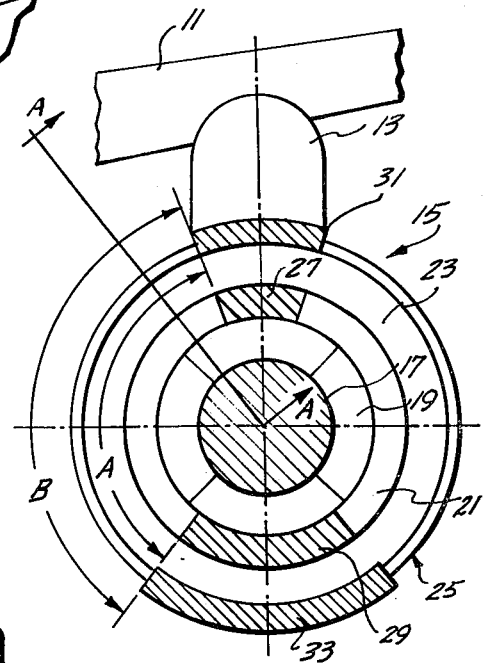
FIG. 1 is a transverse cross-sectional view of a long duct fan jet engine and is used to illustrate: (a) the section line whereat the other figures used to illustrate the various embodiments of the invention is located (along line A—A); and, (b) the lateral regions whereat thrust reversal air exits from a fan jet engine including a thrust reversal control system formed in accordance with the invention.

Turning now to the drawings, FIG. 1 is a transverse cross-sectional, generalized, diagram of a long duct fan jet engine longitudinally taken whereat the various embodiments of the present invention are located. As will be better understood from the following discussion, the cross-sectional views of the various embodiments of the invention are taken along line A—A of FIG. 1.

FIG. 1 illustrates a wing 11 supporting a downwardly and forwardly extending strut 13. The strut supports a long duct fan jet engine assembly 15 generally in front of and beneath the leading edge of the wing 11. The fan jet engine assembly 15 is illustrated as generally circular in cross-section and includes a plug or exhaust cone 17 located at its center. Surrounding the plug 17 is the primary air duct 19, through which primary air normally flows. As will be recognized by those skilled in the jet engine art, the outer wall of the primary air duct 19 is defined by an inner structure 21. Surrounding the primary air duct defining inner structure 21 is the fan air duct 23. The outer wall of the fan air duct is defined by the engine nacelle 25.

As will be better understood from the following description of preferred embodiments of the invention, primary air may augment the fan air during thrust reversal or it may be spoiled and exhausted into the fan air duct. In either case, primary air flows into the fan air duct thru two radial passageways located in the internal structure 21. Each radial passageway covers an arc A of slightly greater than 90°, with one passageway located on each side of the internal structure 21. The two passageways are opened and closed by the control mechanism of the invention and form the regions through which primary air flows into the fan air duct during thrust reversal. The two passageways are defined by upper and lower structural regions 27 and 29.

In order to prevent thrust reversal air, be it only fan air or primary air and fan air, from being directed downwardly, the cascade vanes only cover arcuate regions B, also slightly greater than 90°, located on both sides of the nacelle 25. The cascade vanes are separated by an upper strut structure 31 and a lower structural region 33.

It will be appreciated that arcs A and B may take on various other angular degrees, depending upon the particular nature of the engine and aircraft with which the invention is to be utilized. Thus, the arcuate sizes illustrated in FIG. 1 and broadly denoted above are to be considered as exemplary and not limiting.

Figure 2:
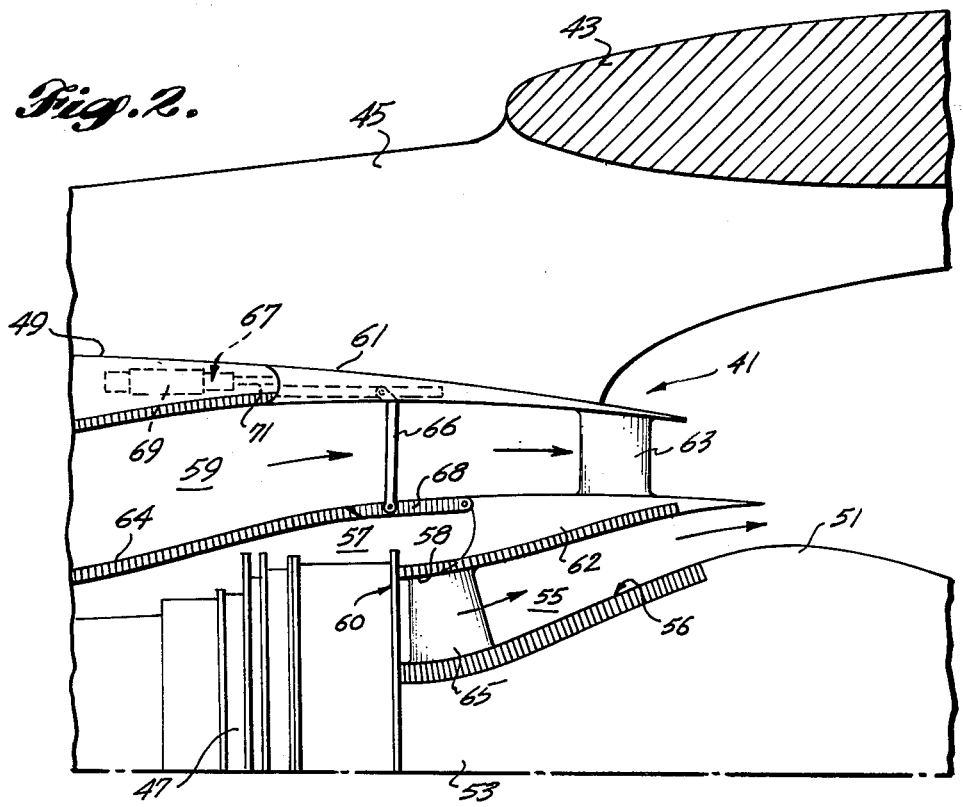
FIG. 2 is a cross-sectional view of an embodiment of the invention wherein primary air is spoiled, in its non-thrust reversal state.

FIGS. 2 and 3 are partial cross-sectional views taken along line A—A of FIG. 1 and illustrate an embodiment of the invention wherein primary air is spoiled and exhausted rearwardly from a long duct fan jet engine during thrust reversal. FIG. 2 illustrates the location of various elements of this embodiment of the invention when the engine is in a non-thrust reversal mode of operation and FIG. 3 illustrates the position of these elements when the engine is in a thrust reversal mode of operation.

FIGS. 2 and 3 illustrate a portion of a long duct fan jet engine assembly 41 supported rearwardly of the leading edge of a wing 43 by a downwardly and forwardly projecting strut 45. The jet engine assembly 41 includes a primary air turbine section 47 and a fan air section (not shown). The primary and fan air sections are mounted inside of an engine nacelle 49, only an upper rear quadrant of which is illustrated in FIGS. 2 and 3. Located at the rear of the primary air section 47 is a plug 51. Moving rearwardly, the plug 51 first diverges outwardly and then inwardly with respect to the centerline 53 of the jet engine assembly 41. As is customary, the plug lies in a primary air duct 55 and, thus, its outer surface defines the inner wall 56 of a primary air duct.

The outer wall 58 of the primary air duct is defined by the skin of an inner structure 57 extending rearwardly from the aft engine flange 60 of the primary air turbine section 47. The aft portion of the inner structure 57 forms the primary air duct exhaust nozzle 62. The outer wall or skin of the inner structure 57 defines the inner wall 64 of the fan air duct 59 and the inner wall or skin of the nacelle 49 forms the outer wall of the fan air duct. The aft portion of the nacelle generally defines the fan air duct exhaust nozzle 61. The primary air duct exhaust nozzle 62 is attached to the fan air duct exhaust nozzle 61 by outer radial struts 63 lying in the fan air duct. In addition, inner radial struts 65 lying in the primary air duct affix the plug 51 to the inner structure 57. (As an alternative, the plug may be bolted directly to the engine, aft of the turbine wheel).

Also illustrated in FIGS. 2 and 3 is a fan air duct blocker door 68. The fan air duct blocker door 68 is open and forms a portion of the inner wall 64 of the fan air duct 59 when the engine is in a non-thrust reversal mode of operation. The fan air duct blocker door 68 is hinged to the inner structure 57, immediately forwardly of the primary air duct exhaust nozzle 62. A drag link 66 runs between the blocker door 68 and the fan air duct exhaust nozzle 61. The primary and fan air duct exhaust nozzles are translatable along the axis 53 of the engine assembly 41. When this action occurs, the drag link 66 moves the fan air duct blocker door 63 between its open position and its closed, or fan air duct blocking, position.

The primary and fan air duct exhaust nozzles are translated by an actuator that may take the form of a ball/screw mechanism 67. The ball/screw mechanism is housed in the nacelle in front of the fan air duct cascade nozzle and comprises a longitudinally fixed housing 69 surrounding a motor rotated threaded shaft 71. The aft end of the threaded shaft is affixed to the fan air duct exhaust nozzle 61. As will be readily understood by those skilled in the art, rotation of the shaft 71 causes it to move in one direction or the other direction, depending upon the direction of rotation. This action translates the primary and fan air duct exhaust nozzles 62 and 61 rearwardly, or returns them to their forward positions. As an alternative to a rotating shaft, the threaded shaft could be non-rotatable and the housing rotatable.

As the primary and fan air duct exhaust nozzles are translated rearwardly, a fan nozzle throat 73 is formed between adjacent regions of the split nacelle. Located in the fan nozzle throat 73 are a plurality of cascade vanes 75. The cascade vanes vanes are vanes that are mounted in the nacelle and curved forwardly such that fan air passing between the vanes is directed toward the front of the engine. At this time, the fan air duct blocker door 68 blocks the fan air duct aft of the location of the fan nozzle throat 73.

As noted above, as the fan air duct exhaust nozzle 61 is translated rearwardly, the primary air duct exhaust nozzle 62 is also translated rearwardly. This latter translation: (1) closes the primary air duct and, (2) exposes a perforated plate or spoiler 77 located in the inner structure 57 between the primary air duct 55 and the fan air duct 59. The primary air duct is closed where the primary air duct exhaust nozzle meets the diverging portion of the plug 51. The perforated plate is located aft of the fan air duct blocker door 68 and spoils primary air passing therethrough. More specifically, because the primary air duct is now blocked primary air exits from this duct via the perforated plate. The perforated plate functions as a spoiler. The energy in the primary air is further reduced because it is allowed to expand into the fan air duct whose size is substantially larger than is the size of the primary air duct (by approximately 300%). The spoiled, expanded primary air is finally exhausted axially out the fan air duct exhaust nozzle, at very low velocity. While the primary air is still exhausted axially parallel to the wing flow stream, its energy is substantially reduced, whereby it does not tend to unload the wheels of the aircraft nor spray soot and heat against the underside of the wing.

It will be appreciated from viewing FIGS. 2 and 3 in combination with FIG. 1 that the spoiler 77 covers two arcs, generally defined by the angle A, and the cascade vanes cover two arcs, generally defined by the angle B. The arcs are located on opposite or lateral, under-the-wing sides of the engine assembly, as illustrated in FIG. 1. Obviously, the primary and fan air ducts are blocked in their entirety by the related blocking elements.

Figure 4:
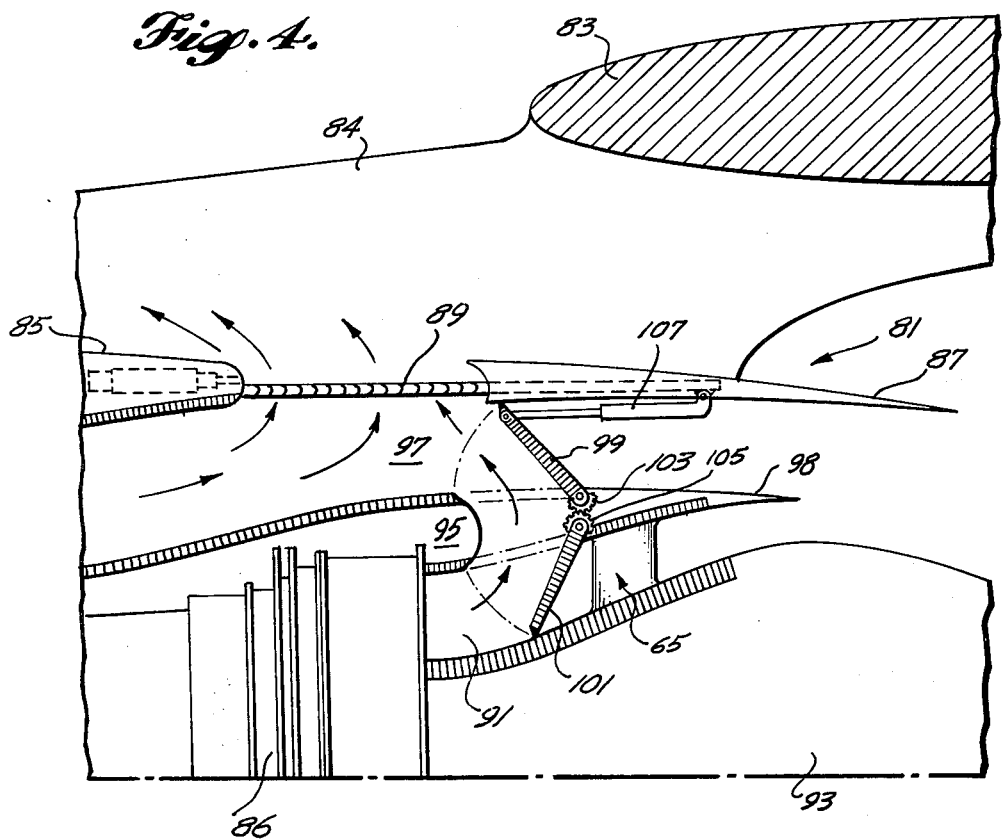
FIG. 4 is a cross-sectional view of an embodiment of the invention wherein both primary air and fan air of equal pressure are utilized for thrust reversal, the primary air being mixed with the fan air prior to exhaustion through cascade vanes.

FIG. 4 illustrates an embodiment of the invention wherein primary air as well as fan air is reversed and includes a jet engine assembly 81 supported from in front of and beneath a wing 83 by a strut 84. The engine assembly 81 includes a high pressure section 86 that generates primary air, and a fan air section (not shown) that generates fan air, both housed in a nacelle 85. A primary air duct 91 is located aft of the primary air section 86 about a plug 93. The outer wall of the primary air duct is defined by an inner structure 95. And, as with FIGS. 2 and 3, the inner wall of a fan air duct 97 is defined by the inner structure 95. The outer wall of the fan air duct 97 is defined by the inner wall of the nacelle 85. The fan air duct exhaust nozzle 87, defined by the aft portion of the nacelle 85 is axially translatable to expose a plurality of cascade vanes lying in a mixed flow nozzle throat 89.

When the engine is in its non-thrust reversal mode of operation, located in the inner wall the fan air duct 97, generally rearwardly of the location of the mixed air nozzle throat 89, is a fan air duct blocker door 99. Located in an adjacent position in the outer wall of the primary air duct 91 is a primary air duct blocker door 101. Thus, the fan and primary air duct blocker doors are located in the outer and inner walls of the inner structure 95. Located aft of the primary air duct blocker door 101 are the radial struts 65 that extend between the plug 93 and a primary air duct exhaust nozzle 98 defined by the aft portion of the inner structure 95.

The fan air duct blocker door 99 and the primary duct blocker door 101 are hinged along their aft edges and are coupled together via a pair or pairs of intermeshing helical gears 103 and 105, one gear of each pair being affixed to an associated blocker door at its axis of rotation. Thus, as one of the blocker doors is moved, the other blocker door is also moved. A drag link 107 extends between the fan air duct exhaust nozzle 87 and the fan air duct blocker door 99. (The fan air duct exhaust nozzle 87 is translated by any suitable mechanism, such as a ball/screw mechanism of the type generally illustrated in FIGS. 2 and 3 and discussed above.) When the fan air duct exhaust nozzle is translated, the drag link 107 causes the fan air duct blocker door 99 to rotate outwardly and rearwardly to a fan air duct blocking position. At the same time, due to the action of the intermeshing gears 103 and 105, the primary air duct blocker door 101 rotates downwardly and rearwardly to a primary air duct blocking position. The "closing" of the duct blocking doors opens a channel or passageway in the inner structure 95 extending between the primary air duct 91 and the fan air duct 97. This channel allows primary air to mix with fan air and exhaust through the cascade vanes 97 in a thrust reversal direction. Hence, in this embodiment of the invention, primary air augments the thrust reversal effect of fan air. As will be appreciated by those skilled in the art, mixing of primary air and fan air is only allowable if they are at substantially the same pressure when they join.

The FIG. 5 embodiment of the invention is substantially identical to the FIG. 4 embodiment except that a mix preventing door 105 is provided. The mix preventing door 105 prevents primary air from mixing with fan air prior to exhaustion from the engine. Since the structures are substantially identical, only the changes related to the mix preventing door will be herein described, the reference numerals in FIG. 5 being the same as those used in FIG. 4 for other elements.

The mix preventing door 105 forms a portion of the inner wall the fan air duct 97 when the engine is in its non-thrust reversal mode of operation and is located immediately forward of the fan air duct blocker door 99. The mix preventing door 105 rotates along its rear edge and includes a lever arm 107 extending outwardly from its axis of rotation. The lever arm is attached by a drag link 109 to another lever arm 111 affixed to the fan air duct blocker door 99 and extending outwardly from its axis of rotation. The lever arms and drag link 109 are located such that, as the fan air duct blocker door 99 is rotated by the translation of the fan air duct exhaust nozzle 87, the drag link 109 applies a rotational force to the mix preventing door 105. If the translation is rearward, this rotational force moves the mix preventing door 105 to a fan air duct blocking position foward of the fan duct blocking position of the fan air duct blocker door 99. The region between the two fan air duct blocking doors defines a channel 113 that directs primary air from the primary air duct to the cascade vanes. The mix preventing door 105 intersects the cascade vanes at some suitable point and, thus, causes a primary air nozzle throat 106 and a fan air nozzle throat 108 to be formed at the cascade vanes.

Figure 6:
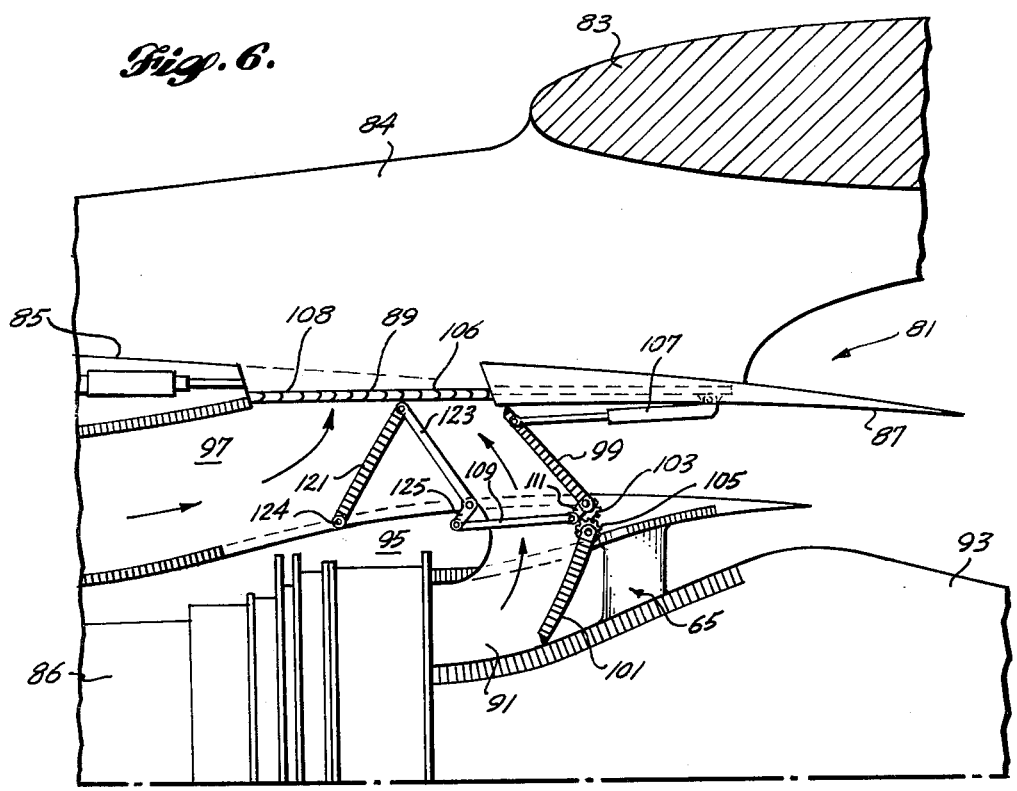
FIG. 6 is a cross-sectional view of an alternate embodiment of the invention, similar to the FIG. 5 embodiment, wherein the fan air duct blocker door is reoriented, primary and fan air both being used for thrust reversal, with unequal pressure primary air and fan air being maintained separate prior to exhaustion through cascade vane turning nozzles.

FIG. 6 is an embodiment of the invention generally similar to the embodiment of the invention illustrated in FIG. 5 except that the mix preventing door is located in a different position and operated in a different manner. More specifically, the mix preventing door 121 illustrated in FIG. 6 forms a portion of the inner wall of the fan air duct 97, when the engine is in its non-thrust reversal mode of operation, and is located substantially forward of the fan air duct blocker door 99. The mix preventing door 121 includes laterally located, front edge rollers 124 that ride in tracks formed in the inner structure 95. One end of a hinge link 123 is rotatably attached to the inner structure 95 immediately forward of the fan air duct blocker door (when in its non-reversal position). The other end of the hinge link 123 is rotatably attached to the rear edge of the mix preventing door 121. A lever arm 125 attached to the hinge link 123 at its inner structure rotation point is connected by the drag link 109 to the lever arm 111 affixed to the fan air duct blocker door 99.

In operation, as the fan air duct exhaust nozzle 87 is translated rearwardly, and causes movement of the drag links 107 and 109, as discussed above, the hinge link 123 is rotated outwardly and rearwardly. As the hinge link 123 rotates in this manner, the mix preventing door 121 rotates outwardly and moves rearwardly, as the rollers 124 move in their channels. This action continues until the mix preventing door 121 intersects the cascade vanes. Thus, again, a primary air channel is formed and the cascade vanes are separated into a primary air nozzle throat 106 and a fan air nozzle throat 108.

Figure 7:
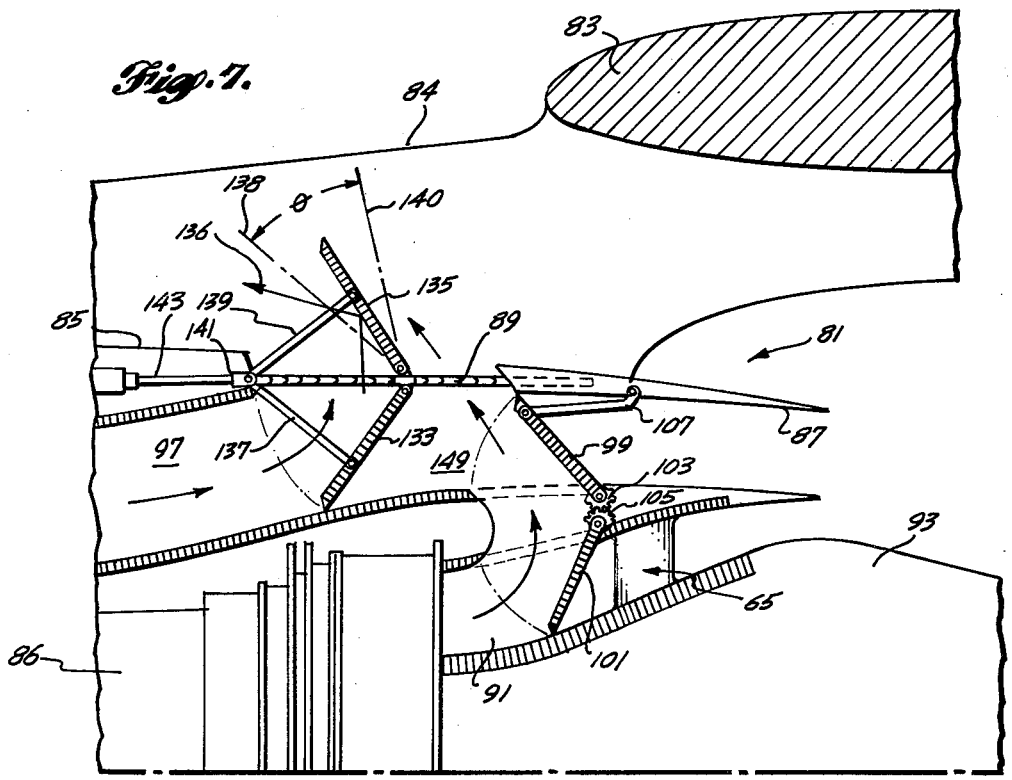
FIG. 7 is a cross-sectional view of an alternative to the FIG. 6 embodiment, wherein primary air and fan air are vector controlled during thrust reversal; specifically, the primary air and fan air are vectored by an external door which deflects fan air by impingement and primary air by coanda attachment to the backside of the door.

FIG. 7 illustrates a further embodiment of the invention including a fan air duct exhaust nozzle 87 formed by the aft portion of a split nacelle 85 that translates rearwardly and simultaneously causes a fan air duct blocker door 99 and a primary air duct blocker door 101 to move to duct blocking positions. Since this structure is identical to the same structures illustrated in FIGS. 4–6, it will not be further described here. Rather, the different mix preventing door arrangement, adapted to block the fan air duct 97 forward of the fan air duct blocker door 99, illustrated in FIG. 7 will be described.

The mix preventing door arrangement of the embodiment of the invention illustrated in FIG. 7 includes an inner door 133 and an outer door 135. These doors are located on either side of the forward region of the cascade vanes. When the engine is in a non-thrust reversal mode of operation, the inner door forms a portion of the outer wall of the fan air duct 97 and the outer door 135 is a vectoring door and forms a portion of the outer surface of the nacelle. Thus, the inner and outer doors close the passageways through the front portion of the cascade vanes. The rear portion of the cascade vanes are covered and exposed by the translatable fan air duct exhaust nozzle 87.

The inner and outer doors 133 and 135 are hinged along their rear edges. Rotatably affixed to mid-regions of the inner and outer doors are inner and outer lever arms 137 and 139. The lever arms project toward one another and are rotatably attached to a ball screw nut 141 mounted on the threaded shaft 143 that translates the fan air duct exhaust nozzle 87.

In operation, when the threaded shaft is rotated, the ball screw nut 141 moves longitudinally causing the inner and outer lever arms 137 and 139 to be extended, as the aft portion of the nacelle is translated rearwardly. The inner door 133 is moved until its front edge intersects the inner wall of the fan air duct, at which point the fan air duct blocker door is in its duct blocking position and the fan air duct exhaust nozzle 87 is fully translated rearwardly.

It will be appreciated from the foregoing description that the inner door 133 is a mix preventing door and that it, in combination with the fan air duct blocker door 99, defines a channel 149 through which primary air flows. Thus air exits from the engine through a primary air nozzle throat 89 formed by the aperture in the nacelle created when the aft portion 87 of the nacelle is translated rearwardly. The portion of the nacelle exposed by the movement of the inner and outer doors 133 and 135 to extended positions forms a fan air nozzle throat. With respect to the translation of the aft portion of the nacelle, it is substantially shorter in the FIG. 7 embodiment of the invention than in the other embodiments, since a substantial portion of the cascade vanes are enclosed by the inner and outer doors 133 and 135.

The outer door 135 vector controls the exhausting primary and fan air. The direction of fan air is controlled by impingement on the inner side of the outer door 135, as denoted by the articulated arrow 136. The direction of primary air is controlled by coanda attachment to the backside of the outer door. Thus, by controlling the position of the door through an angle $\theta$, control of the exhaust emission direction or angle is provided. Such control of the emission direction is useful to prevent inlet injestion at low rolling speeds. The most acute angle (dash-dot line 138) formed by the outer door 135 with respect to the skin of the nacelle defines the high speed thrust reversal position and the least acute angle (dash-dot line 140) defines the low speed or rolling thrust reversal position.

As will be appreciated by those skilled in the jet aircraft art, the FIG. 7 embodiment of the invention has features and advantages in addition to those provided by the other embodiments of the invention. Specifically, the outer door 135, due to its vectoring capability: (a) permits engine thrust modulation during approach and touch-down without requiring spin-down of the engines; (b) controls the reversed fan and primary air vector during landing roll-out; (c) permits the engines to remain at high speed (RPM) during landing roll-out; and (d) reduces the adverse effects of brake heat-up caused by engine idle thrust during taxi periods. These features result in a wide variety of benefits.

The ability to maintain high engines RPM during approach and touch-down, due to thrust modulation by exhaust vector control, allow abort landing decisions to be delayed. Specifically, abort landing decisions now must take into consideration the time it takes for engine spin-up to occur (up to 3 seconds). Since engine speed is maintained using the invention, the outer door control time is the limiting factor, not engine spin-up time. Further, if the thrust reverser mode of operation is activated spontaneously with wheel braking, landing distance can be reduced from 100 to 250 feet per second of time saved in activation of the thrust reverser after touch-down. In this regard, since engine spin-up and thrust reverser deployment time take up to 3 seconds after touch-down, the invention, if appropriately implemented, will reduce landing distance by up to 300 feet on a dry pavement and up to 750 feet on a wet pavement (i.e. in inclement weather).

Adjustment of the exhaust vector during the entire roll-out regime maximizes reverser braking and reduces inlet ingestion. Further, the engine idle thrust kinetic energy (14% of the airplane's total kinetic energy) can be reduced during roll-out by spoiling the exhaust when the reverser is not in full operation. Permitting the aircraft's engines to remain at high RPM during roll-out also enhances emergency response time. For example, steering control by reverse vectoring during cross-wind and/or wet runway conditions can be accomplished. Reducing brake heating during taxiing, up to take-off, increases the brake capacity available in an abort take-off situation.

It will be appreciated from the foregoing description of FIGS. 5–7, that these embodiments of the invention all prevent primary air from exhausting through the fan air duct axially rearwardly, i.e., out of the fan air duct exhaust nozzle. The embodiments of the invention hereinafter described, while primarily adapted to redirect primary air such that it exhausts through thrust reverser cascade vanes, also allow any primary air not so exhausted to leave via the fan air duct exhaust nozzle.

Figure 8:
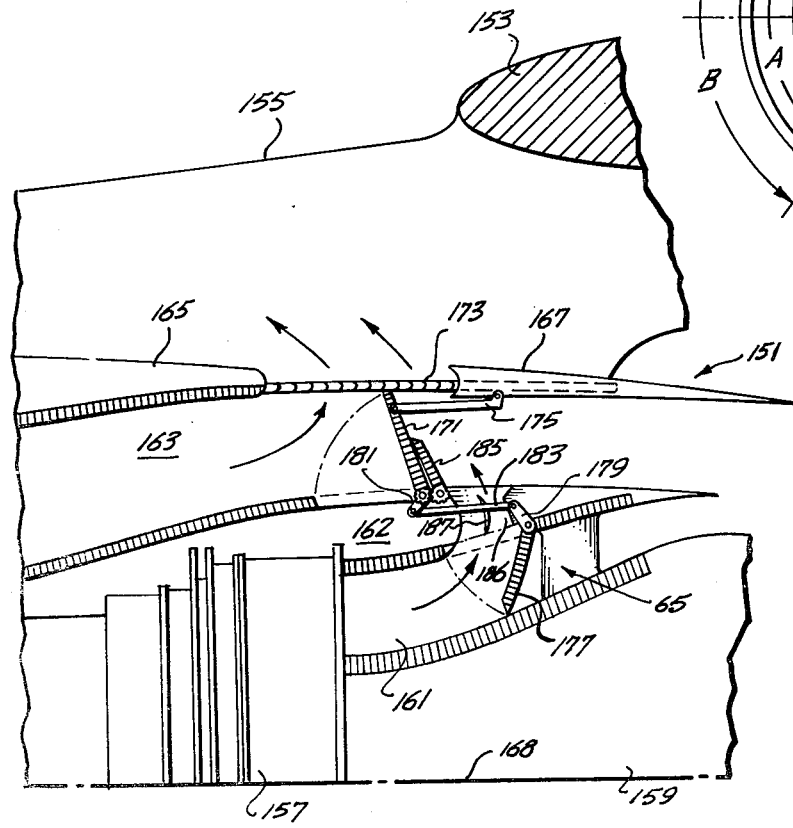
FIG. 8 is a cross-sectional diagram of an embodiment of the invention wherein fan air and all or a portion of primary air are used for thrust reversal, the primary air and fan air being maintained separate prior to exhaustion through cascade vanes.

FIG. 8 illustrates a long duct fan jet engine assembly 151 supported forward and beneath a wing 153 by a strut 155. As with the other embodiments of the invention, the jet engine assembly 151 includes a primary air section 157, having extending rearwardly therefrom an exhaust plug 159. Surrounding the plug 159 is a primary air duct 161 whose outer wall is defined by an inner structure 162. Surrounding the inner structure 162 is a fan air duct 163. Surrounding the fan air duct 163 is a nacelle 165. The aft section of the nacelle 165 defines a fan air duct exhaust nozzle 167 adapted to be longitudinally translated along the axis 168 of the engine assembly.

A fan air duct blocker door 171 is mounted so as to form part of the inner wall of the fan air duct 163 when the engine is in its non-thrust reversal mode of operation. The fan air duct blocker door lies beneath cascade vanes located in the nacelle 165. The rear edge of the fan air duct blocker door 171 is mounted for rotation. The forward end of the fan air duct blocker door 171 is attached via a drag link 175 to the fan air duct exhaust nozzle 167. Thus, as the fan air duct exhaust nozzle 167 is translated rearwardly, the fan air duct blocker door 171 is rotated to a fan air duct blocking position.

Located in the outer wall of the primary air duct 161, when the engine is in its non-thrust reversal mode of operation, is a primary air duct blocker door 177. The primary air duct blocker door is rotatably mounted at its rear edge and is connected to the fan air duct blocker door 171. Connection is made by first and second lever arms 179 and 181 and a link 183. The first lever arm 179 is affixed to the primary air blocker door 177 at its axis of rotation and the second lever arm 181 is affixed to the fan air duct blocker door 171 at its axis of rotation. The link 183 connects the two lever arms together. Thus, as the fan air duct blocker door 171 is rotated to a fan air duct blocking position, the primary air blocker door 177 is rotated to a primary air duct blocking position.

Located immediately to the rear of the fan air duct blocker door 171 is a blowup door 185. The blowup door forms a portion of the inner wall of the fan air duct and is located above a passageway 186 opened when the primary air duct blocker door 177 is moved to its primary air duct blocking position. The blowup door 185 is formed such that it is normally in a position whereat it forms a portion of the inner wall of the fan air duct 163. When the fan air duct and primary air duct blocker doors 171 and 177 are moved to their duct blocking positions, primary air is directed through the passageway 186, within which primary cascade vane nozzles 187 are located, toward the blown-up door 185. The pressure of the primary air is adequate to open the blown-up door 185 if it is free hinged; or it may be opened by helical gears as described above with respect to the FIG. 4 embodiment of the invention. After opening the blown-up door 185, the primary air is generally directed toward the aft portion of the outer cascade vanes 173 by the primary cascade vane nozzles 187. Any primary air that does not exhaust via the cascade vanes 173 exits axially rearwardly through the fan air duct exhaust nozzle as herein described with respect to the FIG. 3, 10 and 11 embodiments of the invention.

Figure 9:
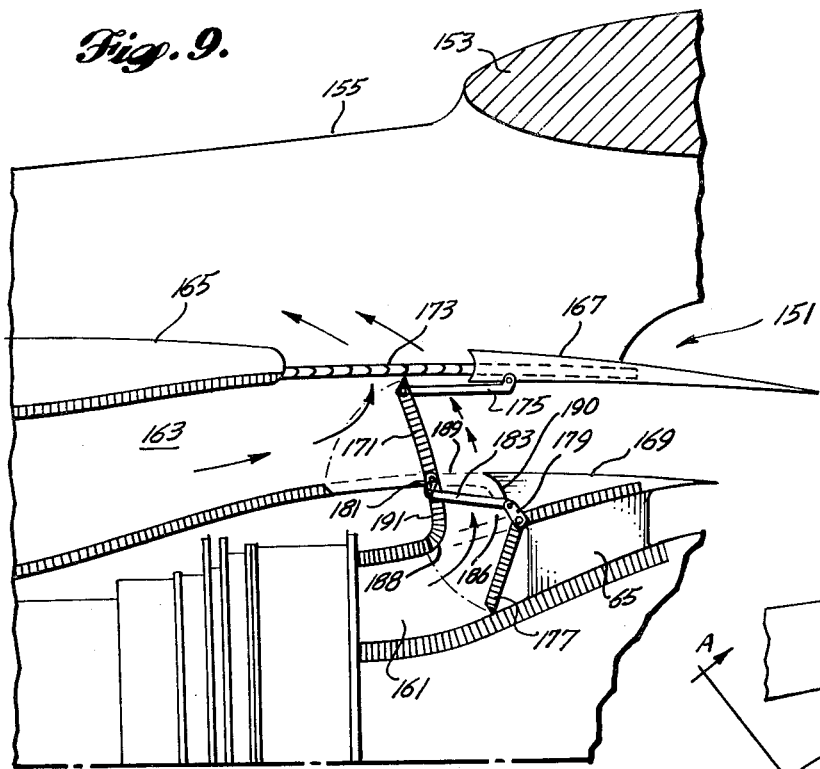
FIG. 9 is a cross-sectional diagram of an alternate embodiment of the invention wherein fan air and all or a portion of primary air are used for thrust reversal, the primary air and fan air being maintained separate prior to exhaustion through cascade vanes.

The FIG. 9 embodiment of the invention is similar to the FIG. 8 embodiment except that the blowup door 185 of the FIG. 8 embodiment is replaced with a rearward extension 191 of the fan air duct blocker door 171. The structure is formed such that when the fan air duct blocker door 171 is rotated to its duct blocking position in the manner previously described, the rear extension 191 of the fan air duct blocker door rotates downwardly and inwardly. In addition to this difference, because the rearward extension passes through the region wherein the curved vanes 187 were located, the vanes are eliminated. Rather, primary air is turned through the passageway 186 by a large radius fairing 188 located along the rear upper edge of the rearward extension 191 of the blocker door 171, and the curved passageway defined by the primary air duct blocker door 177 and the exposed rear wall 190 of the passageway 186. A primary air nozzle throat 189 is defined by the outer end of the passageway 186.

Figure 11:
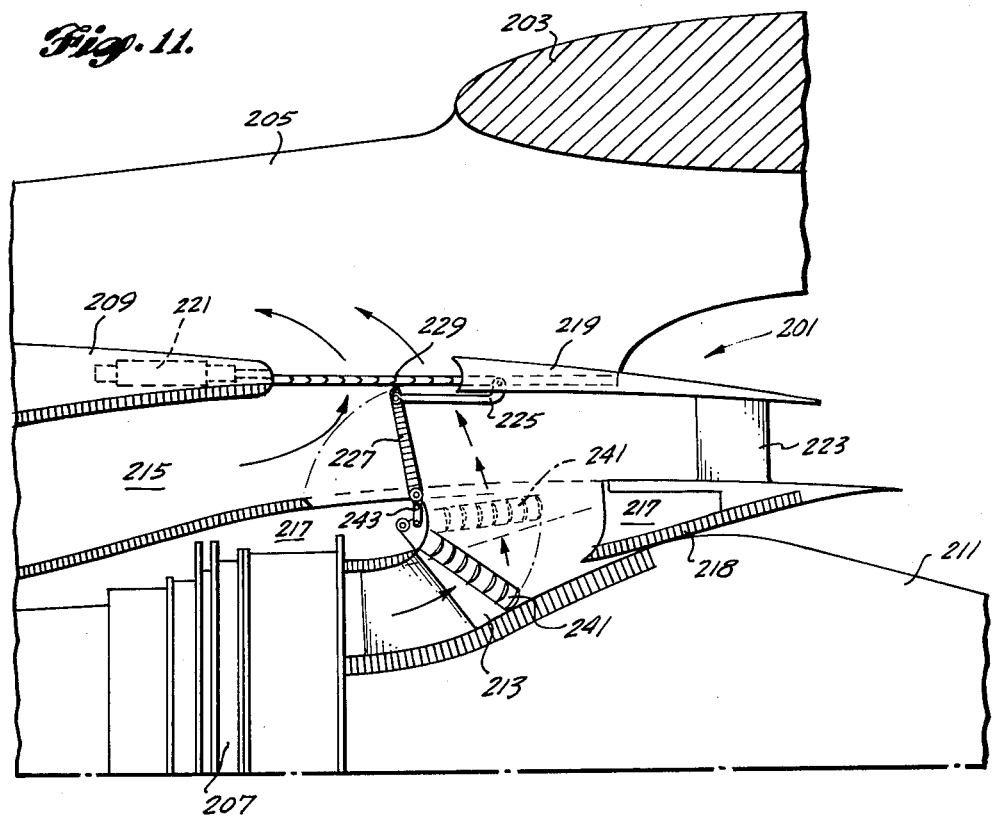
Figure 10:
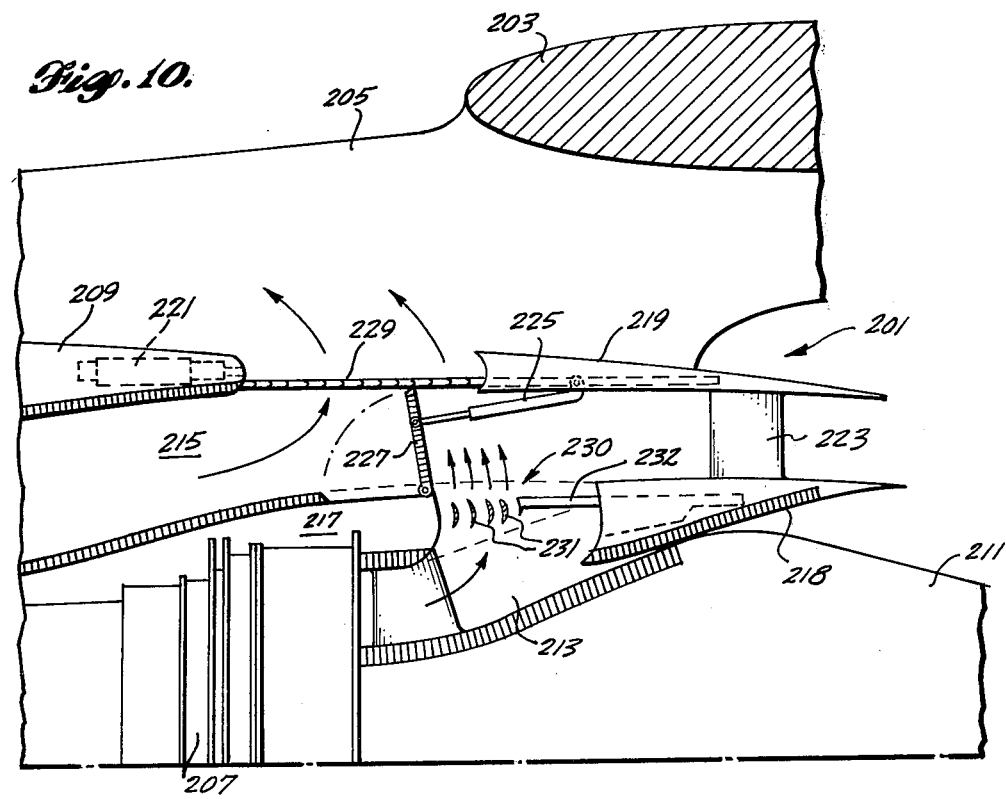
FIG. 10 is a cross-sectional view of a further alternate embodiment of the invention wherein fan air and all or a portion of primary air are used for thrust reversal, the primary air and fan air being maintained separate prior to exhaustion through cascade vanes; and, FIG. 11 is a cross-sectional view of yet another alternate embodiment of the invention wherein fan air and all or a portion of primary air are used for thrust reversal, the primary air and fan air being maintained separate prior to exhaustion through cascade vanes.

The FIGS. 10 and 11 embodiments of the invention are somewhat similar to the FIGS. 8 and 9 embodiments except that, rather than a primary air duct blocking door being utilized to block the primary air duct, the primary air duct exhaust nozzle defined by the aft portion of the inner structure is translated rearwardly in a manner similar to the way that structure is translated rearwardly in the FIGS. 2 and 3 embodiment of the invention. More specifically, FIG. 10 illustrates an engine assembly 201 suspended forward of and beneath a wing 203 by a strut 205. The engine assembly 201 includes a high pressure section 207 and a fan section (not shown) housed inside of a split nacelle 209. A plug 211 extends rearwardly from the high pressure section 207. Surrounding the plug 211 is a primary air duct 213. Located between the primary air duct and a fan air duct 215 is an inner structure 217, the aft portion of which defines a primary air duct exhaust nozzle 218 and is rearwardly translatable. In addition, a fan air duct exhaust nozzle 219 defined by the aft portion of the split nacelle 209 is translatable rearwardly by, for example, a ball screw mechanism 221. The primary and fan air duct exhaust nozzles are attached together by radial struts 223. In addition, a link 225 connects the fan air duct exhaust nozzle 219 to a fan air duct blocker door 227. The fan air duct blocker door is rotatable between a position whereat it forms a portion of the inner wall of the fan air duct 215 and a position whereat it blocks the fan air duct, generally in the mid region of the cascade vanes 229. A primary air nozzle throat 230 is formed by cascade turning vanes 231 and a baffle ring 232 that permit the primary air duct exhaust nozzle 218 to valve off the primary cruise nozzle as described in the FIG. 3 embodiment. Located in the primary air nozzle throat 230 are a plurality of directional vanes 231 adapted to direct primary air toward the rear portion of the cascade vanes 229. Any primary air that does not exit through the cascade vanes in a thrust reversing direction, exits via the fan air duct exhaust nozzle and flows rearwardly.

The FIG. 11 embodiment of the invention is generally similar to the FIG. 10 embodiment except that housed in the passageway of the inner structure 217 opened when the primary air duct exhaust nozzle 219 is translated rearwardly is a racked cascade vane mechanism 241 that is rotated downwardly and forwardly. The directional vane mechanism 241 is linked by lever arms and a link 243 to the fan air duct blocker door 227 at its axis of rotation. Thus, as the fan air duct blocker door 227 is rotated outwardly and rearwardly, the directional vane mechanism 241 is rotated downwardly and inwardly, after a lost motion distance adequate to allow clearance for the primary nozzle 218 to translate rearwardly.

It will be appreciated by those skilled in the art of thrust reversal mechanisms for fan jet engines that primary and fan air duct blocker doors forming a part of various embodiments of the invention are substantially more complex than illustrated in the drawings. However, since such doors are well-known in the prior art, they will not be described in detail here, except to note that they must be formed in a manner such that they "fan" outwardly and inwardly as they are moved between their open and closed positions. The fan action of these doors is necessary to compensate for the fact that the outer periphery of the ends movable away from the duct walls must change between their open and closed positions. By way of example only, such blocker doors are illustrated in U.S. Pat. No. 3,262,270 issued to R. G. Beavers for "Thrust Reverser". In addition, it will be appreciated by those skilled in the art that while single links and lever arms have been illustrated as coupling various movable elements together, in an actual realization of the various embodiments of the invention, a plurality of parallel links and lever arms would be included.

It will be appreciated from the foregoing description that the invention provides combination primary and fan air thrust reversal control systems primarily suitable for use with long duct fan jet engines. More specifically, the invention provides systems for controlling primary air as well as fan air during thrust reversal. Fan air is generally directed toward a plurality of cascade vanes, located at a fan air nozzle throat, that reverse the fan air and direct it toward the front of the engine in a thrust reversal direction. The primary air may be spoiled, partially spoiled or unspoiled and used, if desired, to augment fan air thrust reversal. The fan air duct is normally blocked by a fan air duct blocker door while the primary air duct may be blocked by a primary air duct blocker door or by translating the primary air duct exhaust nozzle rearwardly. The primary air may be maintained separate from the fan air until the air is exhausted from the engine. Or, it may be mixed prior to exhaustion, depending upon the pressures involved.

As noted, the primary air can be spoiled and either partially or entirely axially exhausted from the engine. In either case, the undesirable effect of high energy primary air impinging on the undersurface of the wings is greatly reduced. Because such impingement is reduced, the requirement for the inclusion of special high temperature materials is reduced. In addition, the corrosive damage caused by soot and other factors is reduced or eliminated. Moreover, because thrust reversal vectors are directed outwardly in a sidewise direction and upwardly, but not downwardly, the wheel unloading and other related disadvantages of prior art systems are further reduced or eliminated.

While preferred embodiments of the invention have been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. A combination primary and fan air thrust reversal control system for a long duct fan jet engine assembly adapted to emit fan air and primary air and including a fan air duct and a primary air duct, said combination primary and fan air thrust reversal control system comprising:
    fan air control means for controlling the flow of fan air between a fan air duct exhaust nozzle formed by the aft portion of said fan air duct and a plurality of cascade vanes mounted in a fixed position in a nacelle defining the outer wall of said fan air duct, said nacelle being split such that said fan air duct exhaust nozzle is translatable along the longitudinal axis of said fan jet engine assembly, the axial position of said fan air duct exhaust nozzle controlling the exposure of said plurality of fixed position cascade vanes to said fan air, said fan air control means including said fan air duct exhaust nozzle and a fan air duct blocker door coupled to said fan air duct exhaust nozzle in a manner such that the rearward translation of said air duct exhaust nozzle moves said fan air duct blocker door from a fan air duct open position to a fan air duct closed position;
    primary air control means for controlling the flow of primary air between a primary air duct exhaust nozzle formed by the aft portion of said primary air duct and a region of said fan air duct located generally between said fan air duct exhaust nozzle and said plurality of cascade vanes; and,
    mechanical coupling means for coupling said primary air control means to one of said fan air duct exhaust nozzle and said fan air duct blocker door such that said fan air control means and said primary air control means simultaneously control the flow of fan air between said fan air duct exhaust nozzle and said fixed cascade vanes and the flow of primary air between said primary air duct exhaust nozzle and said region of said primary air duct, respectively, as said fan air duct exhaust nozzle is translated along the longitudinal axis of said fan jet engine assembly.

2. A combination primary and fan air thrust reversal control system as claimed in claim 1 wherein said primary air control means includes a primary air duct blocker means for blocking said primary air duct.

3. A combination primary and fan air thrust reversal control system as claimed in claim 2 wherein said primary air duct exhaust nozzle is translatable along the longitudinal axis of said fan jet engine assembly, and wherein said primary air duct exhaust nozzle translation forms said primary air duct blocker means, said primary air duct exhaust nozzle being affixed to said fan air duct exhaust nozzle.

4. A combination primary and fan air thrust reversal control system as claimed in claim 3 wherein the rearward translation of said primary air duct exhaust nozzle opens a passageway between said primary air duct and said fan air duct and including a spoiler means located in said passageway.

5. A combination primary and fan air thrust reversal control system as claimed in claim 4 wherein said spoiler means is an apertured plate.

6. A combination primary and fan air duct thrust reversal control system as claimed in claim 3 wherein said fan air duct blocker door intersects said cascade vanes at a point forward of the aft termination of said cascade vanes and including a plurality of directional vanes located in the passageway formed when said primary air duct exhaust nozzle is translated rearwardly.

7. A combination primary and fan air duct thrust reversal control system as claimed in claim 6 wherein said passageway forms a primary air nozzle throat.

8. A combination primary and fan air thrust reversal control system as claimed in claim 6 wherein said plurality of directional vanes are movable from a position in said passageway, when said passageway is closed by said primary air duct exhaust nozzle being in its forward position, to a position whereat said additional vanes are located in said primary air duct when said primary air duct exhaust nozzle is translated to its rearward position whereat it closes said primary duct, said plurality of directional vanes being coupled to said fan air duct blocker door for movement between said passageway and said primary air duct as said fan air duct blocker door moves to its fan air duct closed position.

9. A combination primary and fan air thrust reversal control system as claimed in claim 1 wherein:
said fan air duct blocker door forms a portion of the inner wall of said fan air duct when said fan air duct blocker door is in its fan air duct open position, said fan air duct blocker door being rotatably affixed to the inner wall of said fan air duct at its aft end; and,
said fan air duct blocker door and said fan air duct exhaust nozzle are coupled by a drag link extending between said fan air duct blocker door forwardly of its point of rotation and said fan air duct exhaust nozzle.

10. A combination primary and fan air thrust reversal control system as claimed in claim 9 wherein said primary air control means includes a primary air duct blocker door movable between a primary air duct open position whereat said primary air duct blocker forms a portion of the outer wall of said primary air duct and a primary air duct closed position whereat said primary air duct blocker door blocks said primary air duct, when in said primary air duct closed position, said primary air duct blocker door exposing a passageway extending between said primary air duct and said fan air duct, said primary air duct blocker door being coupled by said mechanical coupling means to said fan air duct blocker door for movement between said primary air duct open position and said primary air duct closed position as said fan air duct blocker door moves between said fan air duct open position and said fan air duct closed position.

11. A combination primary and fan air thrust reversal control system as claimed in claim 10 wherein said fan air duct blocker door and said primary air duct blocker door are coupled together by meshing gears.

12. A combination primary and fan air thrust reversal control system as claimed in claim 11 including a mix preventing door mounted forwardly of said fan air duct blocker door and coupled to said fan air duct blocker door so as to be movable to a forward fan air duct blocking position as said fan air duct blocker door is moved to said fan air duct closed position.

13. A combination primary and fan air thrust reversal control system as claimed in claim 10 wherein said fan air duct blocker door and said primary air duct blocker door are coupled together by first and second lever arms, one affixed to each of said blocker doors, and a link.

14. A combination primary and fan air thrust reversal control system as claimed in claim 13 including a blowup door located aft of said fan air duct blocker door and forming a portion of the inner wall of said fan air duct, said blowup door located where the passageway formed between said primary air duct and said fan air duct intersects said fan air duct and adapted to open said passageway to said fan air duct when said primary air duct blocker door is in said primary air duct closed position.

15. A combination primary and fan air thrust reversal control system as claimed in claim 10 including inner and outer doors mounted about said cascade vanes forwardly of said fan air duct exhaust nozzle and extendable outwardly away from said cascade vanes as said fan air duct exhaust nozzle is translated rearwardly, said inner door adapted to block said fan air duct forwardly of said fan air duct blocker door.

16. A combination primary and fan air thrust reversal control system as claimed in claim 15 wherein said outer door is positioned and formed so as to vector control fan air and primary air exhausting through said cascade vanes mounted in said nacelle.

17. A combination primary and fan air thrust reversal control system as claimed in claim 16 wherein fan air is vector controlled by impinging on the inner surface of said outer door and primary air is controlled by following the outer surface of said outer door in accordance with the Coanda effect.

* * * * *